United States Patent [19]

Groeschel et al.

[11] 4,271,356
[45] Jun. 2, 1981

[54] METHOD AND APPARATUS FOR NATURAL GAMMA RAY SPECTRUM ANALYSIS USING MICROPROCESSOR STRIPPER

[75] Inventors: Vernon E. Groeschel; Jorg A. Angehrn, both of Houston, Tex.

[73] Assignee: Dresser Industries, Inc., Dallas, Tex.

[21] Appl. No.: 41,859

[22] Filed: May 24, 1979

[51] Int. Cl.³ ............................................. G01V 5/00
[52] U.S. Cl. ..................................... 250/262; 250/253; 250/256
[58] Field of Search ............... 250/262, 253, 256; 364/422

[56] References Cited

U.S. PATENT DOCUMENTS

| | | | |
|---|---|---|---|
| 3,336,476 | 8/1967 | Richardson | 250/256 |
| 3,940,610 | 2/1976 | Dennis et al. | 250/253 |
| 3,976,878 | 8/1976 | Chevalier et al. | 250/253 |
| 4,013,874 | 3/1977 | Culver | 235/92 PC |
| 4,071,755 | 1/1978 | Supernaw et al. | 250/253 |

*Primary Examiner*—Alfred E. Smith
*Assistant Examiner*—Carolyn E. Fields

*Attorney, Agent, or Firm*—Richard M. Byron

[57] ABSTRACT

Gamma spectrum measurement signals received from a downhole instrument containing a scintillation counter are coupled into a multi-channel analyzer. The analyzer converts the received pulses to pulses in separate channels according to energy levels of the received measurements. The energy channels from the multi-channel analyzer are coupled to digital decoders which are set up for energy level windows for preselected elements and the total occurrence count. These outputs are coupled into a microprocessor stripper which includes storage buffers sized in accordance with the logging rate and crystal utilized in the scintillation counter. These storage registers permit filtering in addition to stripping the various energy channels of the influence radiation caused by the elements having and energy band centered around a higher energy level. After the stripping occurs, the outputs for each of the selected energy channels may be coupled into a digital recorder or into count rate meters for conversion to analog voltages for driving a chart recorder.

7 Claims, 3 Drawing Figures

METHOD AND APPARATUS FOR NATURAL GAMMA RAY SPECTRUM ANALYSIS USING MICROPROCESSOR STRIPPER

BACKGROUND OF THE INVENTION

This invention relates to a method and apparatus for radioactivity well logging and more particularly to techniques for producing radioactive logs indicative of the natural gamma radiation occurring in preselected energy bands.

As is well known in the art, natural gamma rays produced by the earth formations provide an indication of the occurrence of the naturally occurring radioactive elements, such as thorium, potassium and uranium. Since these elements produce gamma rays having different energy levels, a well logging instrument having the capability for measuring the energy of such gamma rays, for example, one having a scintillation counter, thus provides a means of ascertaining the existence of such elements.

Various methods and apparatus have been utilized in the well logging art to study such radioactive properties of subsurface formations. Accordingly, logs of such properties aid in the study of the nature of the subsurface formations, particularly in exploration for minerals and hydrocarbon deposits. It has been found that a correlation may be established between the uranium, potassium and thorium content of the subsurface formations which can be used as an indicator of the organic matter content therein. It is known that potassium, uranium and thorium are important natural sources of gamma radiation. Each of these elements either contains or radioactively decays to radioactive isotopes which emit gamma radiation at the above-mentioned characteristic energy levels. Further, the natural gamma rays spectrum for the given formation exhibits peaks of intensity at energies corresponding to the potassium, uranium and thorium content of the formation.

Unfortunately, gamma rays attributable to higher energy sources of radiation may decay to a lower energy level resulting in the contamination of the measurements of lower energy level sources. Thus, gamma rays having energy levels attributable to one element, for example, uranium may also include reduced energy level radiation caused by a higher energy level element such as thorium. Similarly, measurements taken of the radiation occurring in the energy level attributable to potassium may also include radiation counts attributable to uranium and thorium radiation.

As a result, the prior art has been directed to providing means of stripping lower energy level radiation of the radiation influence caused by the generation of the gamma radiation from higher energy band signals which have deteriorated. In one such prior art system, described in U.S. Pat. No. 3,940,610, issued Feb. 24, 1976 to Dennis et al, the measured gamma ray spectra are passed through three energy band selectors, each comprising a single channel discriminator and count rate meter to separate the output of the gamma ray detector into potassium, uranium and thorium energy band signals while at the same time converting the radioactive counts to analog voltages. These analog signals are then passed through operational amplifier circuits which have been calibrated to algebraically remove the influence resulting from higher energy level elements.

The use of analog stripping techniques, however, offers several disadvantages in operation and reliability. First, the counts are converted to voltage levels, with the accompanying inclusion of time constants. Thus, the data is partially processed prior to any stripping with a loss in data accuracy which could be obtained by stripping raw data.

Second, the difficulty in calibrating analog circuits reduces the repeatability of the measurements. Different logging runs through the same section of a borehole may give different results even when radiation levels remain constant. Further, in setting up the analog calibrations, time constants must be matched or the resultant measurement curves will have a different statistical appearance.

Third, the use of analog circuits permits the measurement curves to display values less than zero. This results in having to calibrate each analog circuit with respect to the other analog circuits with no means to branch when no measurements are available for one of the measured elements.

These and other disadvantages are overcome with the present invention wherein improved methods of stripping and filtering the spectral data using digital techniques are provided.

SUMMARY OF THE INVENTION

The natural gamma radiation in subsurface earth formations is detected by a logging instrument containing a gamma ray detector such as a crystal scintillation counter. The radiation measurements are coupled into a multi-channel pulse height analyzer to separate the measurements into separate energy bands having energy levels centered at a peak of intensity corresponding to each elemental source of gamma radiation.

In a preferred embodiment, the energy band signals centered about the energy peak levels corresponding to the potassium, uranium and thorium energy bands are applied to a microprocessor stripping unit to remove the influence from gamma radiation of other higher-energy level radiation. Under control of the microprocessor, a counter associated with each energy band being measured is incremented each time there is detection by the logging instrument of gamma radiation falling within the specified band. Then the counters, each of which corresponds to a separate energy band measurement, are read and if greater than zero the counter is decremented and a preselected digital number is added to a designated storage register. The counter corresponding to the highest level energy band, thorium, is read and if counts are found therein the registers corresponding to the potassium and uranium energy level bands are polled to ascertain if they are greater than zero. If the contents of both of the registers are greater than zero, the thorium or high energy band counter is decremented by one and preselected digital numbers are subtracted from both the lower energy band registers. Thus, a preselected number of digital counts are subtracted from the counts contained in the uranium register and a second preselected number of counts are subtracted from the digital counts contained in the potassium register. It is apparent however that upon polling any of the energy band counters, if there are no counts therein, the above-described steps will be skipped and none of the above-described additions or subtractions will occur.

Next, the register associated with the potassium energy band will be read and if found to contain a digital number greater than zero, it will be compared with a predetermined range. If the contents of the potassium register are greater than the contents of the range register, a pulse indicative of an occurrence within the potassium energy band is output and the digital number originally added into that register is subtracted therefrom. The above-described process is repeated with the uranium energy band. However, after the uranium range check, the potassium energy band register is again checked to ascertain if it is greater than zero. If it is, a digital number indicative of the influence from the higher energy band is subtracted. If the contents of the register is less than zero, this step is omitted. In both instances, a pulse is output indicative of the occurrence of gamma radiation within the specified energy level and the digital number added to the register associated with the uranium energy band is subtracted therefrom.

The stripped and filtered pulses are then outputted from the microprocessor stripping unit in digital form and may thereafter be directly recorded by a digital recorder or coupled through a count rate meter to convert the digital counts to analog voltages for display on a chart recorder.

It is therefore the primary object of the present invention to provide a digital stripping unit for use in gamma radiation logging.

It is also an object of the invention to provide a method and apparatus for stripping the influence of different energy band radiation from spectral measurement data prior to any processing of the data.

These and other objects, features and advantages of the present invention will be more readily understood by those skilled in the art from a reading of the following detailed description with reference to the accompanying drawings in which.

DETAILED DESCRIPTION OF A PREFERRED EMBODIMENT

Figures 1, 3:
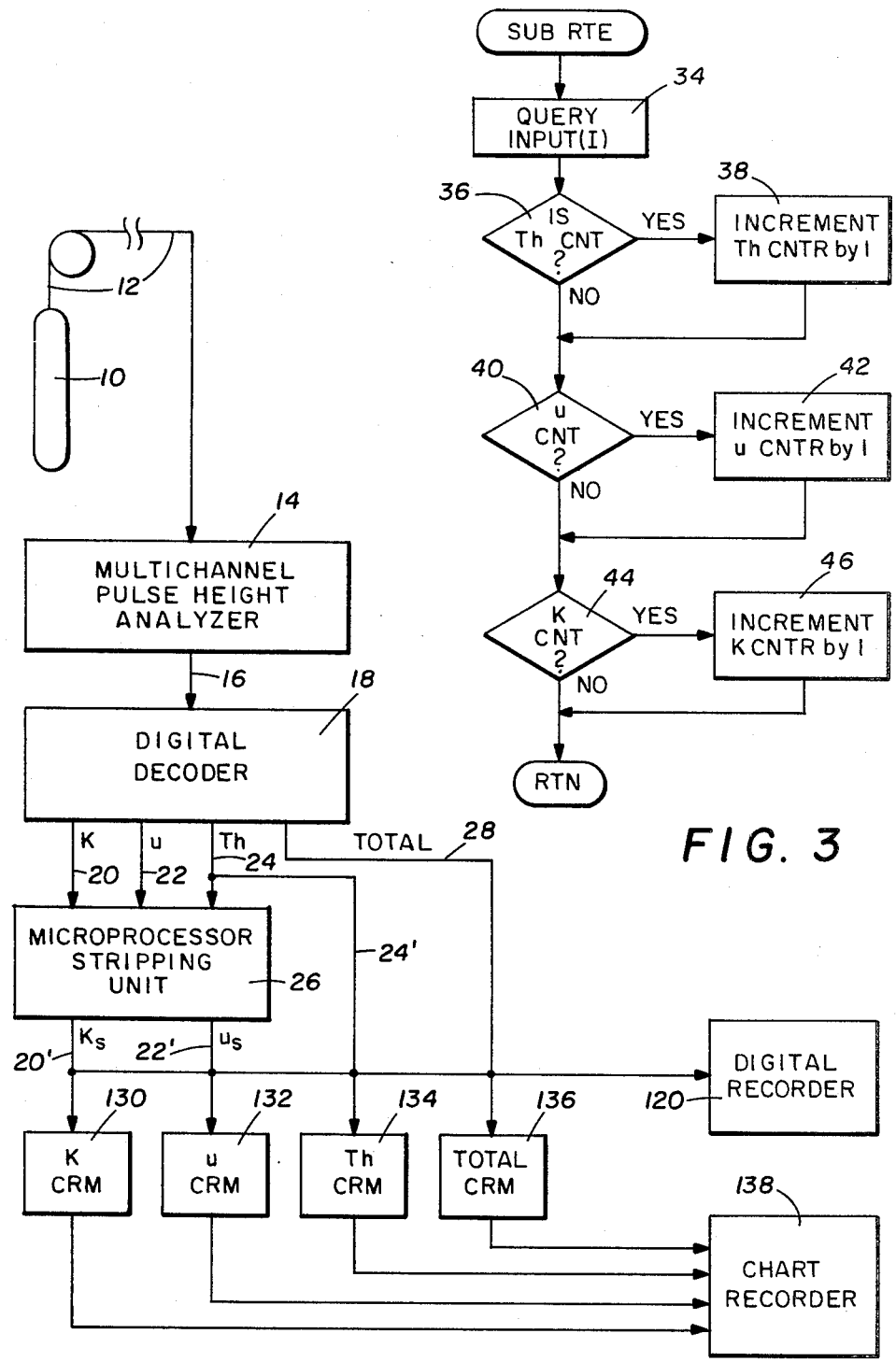
FIG. 1 is an overall block diagram showing schematically a system embodying the concepts of the invention.
FIG. 3 is a logic flow diagram depicting a technique for incrementing counters associated with various energy bands in accordance with the invention.

Referring now to FIG. 1, there is shown a borehole logging tool 10 of the type used for traversing subsurface formations (not shown) to measure the natural gamma radiation emitted by elements within the formations. The logging tool 10 is preferably of the scintillation type detector well known in the art and includes a crystal cooperating with a photo multiplier tube to detect the gamma radiation. In operation, the crystal gives off a quanta of light energy called photons, the intensity of which is proportional to the energy of the gamma ray interaction in the crystal. The photo multiplier responds to these photons to produce a succession of pulses having magnitudes proportional to the energy of the gamma rays impinging upon the crystal. It is standard practice to amplify the pulses and transmit them uphole over a logging cable 12 where they are coupled into a multi-channel pulse height analyzer 14. Analyzer 14 sorts the incoming measurement signals and stores them in a plurality of storage channels according to the pulse height or energy level of the signal. The energy channels from the multi-channel analyzer are coupled into a digital decoder 18 which is set up to provide energy level windows for any of the radiation emitting elements contained within the subsurface formation. In a preferred embodiment, the energy level windows of digital decoder 18 are set to pass incoming pulses, in a digital format, for radiation resulting from potassium, uranium, thorium and total count, outputting the signals over lines 20, 22, 24 and 28 respectively.

Unfortunately, however, some deterioration may occur in the energy level of the radiation emitted by an element contained in the subsurface formation so that, when measured, radiation from an element belonging in a higher energy band may exhibit a pulse height which would place it in a lower energy band. Accordingly, the energy band corresponding to uranium (U) may be influenced by thorium (Th) counts which have a degenerated energy level. Similarly, a potassium (K) channel may be influenced by reduced pulse-height counts attributable to both uranium and thorium gamma ray radiation. The present invention is directed to removing such influences from each energy band by coupling the outputs from digital decoder 18 for the potassium, uranium and thorium channels into a microprocessor stripping unit 26. Unit 26 performs the stripping function in accordance with the present invention as will be hereinafter explained.

Figure 2:
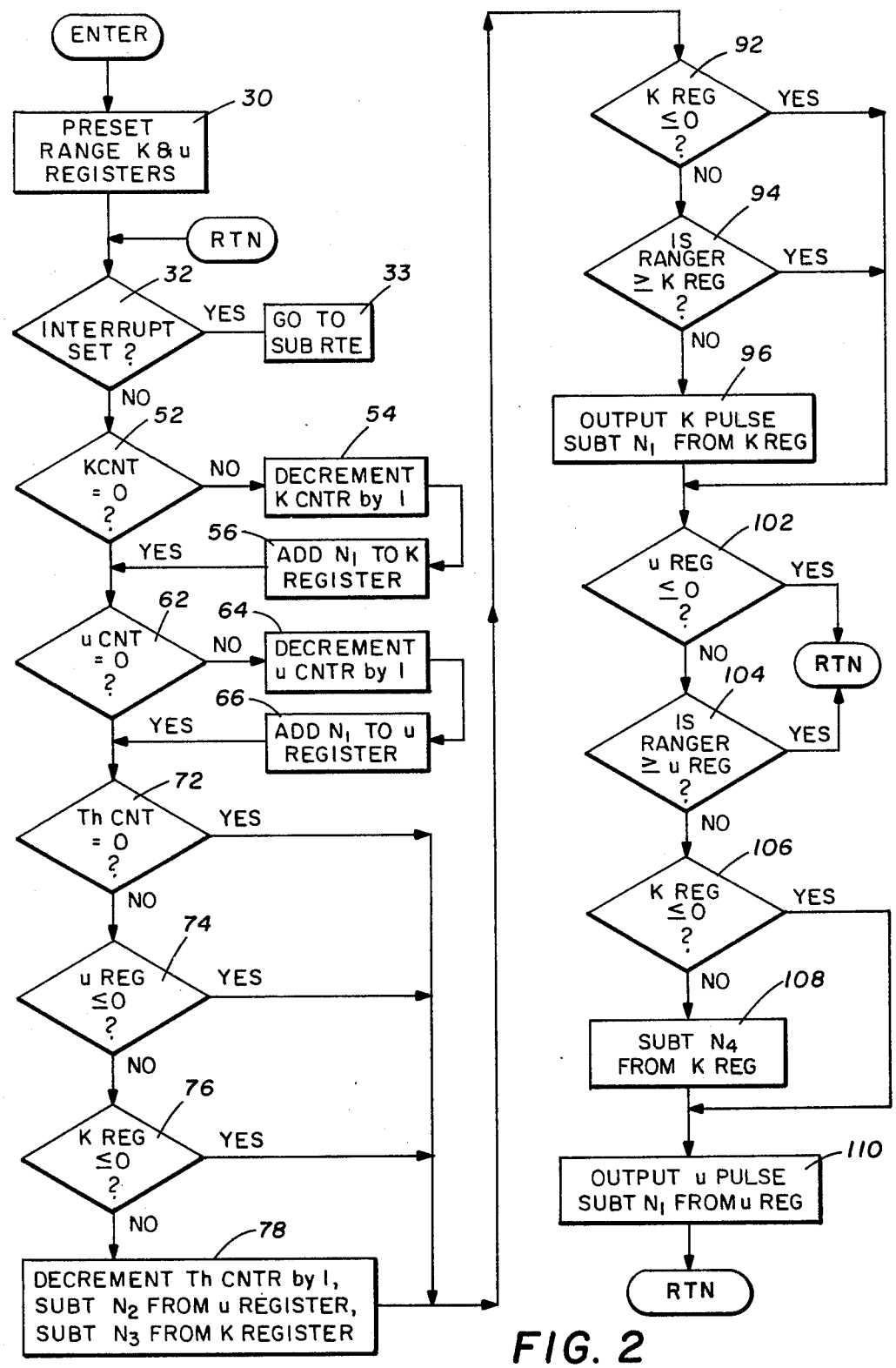
FIG. 2 is a logic flow diagram depicting a technique of performing the stripping in accordance with the invention.

Referring now to FIGS. 2 and 3, there are shown logic flow diagrams in accordance with the method of the invention. Although not shown, the apparatus necessary for performing the method will be apparent to one skilled in digital techniques from a reading of this specification in conjunction with the logic routines depicted in FIGS. 2 and 3. Upon initialization, microprocessor stripping unit (MSU) 26 clears all registers and counters contained therein and enters into the functional logic flow routine depicted in FIGS. 2 & 3.

Referring again to FIG. 2, when the MSU 26 begins stepping through the logic routine, the first step is to enter a range preset for the potassium (K) and uranium (U) channels as indicated at block 30. The purposes of the range presets will be hereinafter described in greater detail. The next step, as indicated by decision block 32, is to ascertain if an interrupt flag has been set and, if so, to initialize the interrupt routine depicted in FIG. 3. The interrupt flag is set upon receipt by microprocessor stripper unit 26 of a pulse over any of lines 20, 22 or 24. The pulse represents detection of radiation in one of the described energy bands. Upon entering the interrupt routine, MSU 26 queries the inputs, as indicated in block 34, performing tasks at each of the input channels to ascertain if a pulse has been received thereon. As shown, block 36, 40 and 44 indicate performance of a test on the thorium, uranium and potassium channels, respectively, to ascertain the presence of a pulse. If a thorium pulse is present, a first counter is incremented by one as indicated in block 38. Next, uranium channel is polled, as indicated in block 40, if a pulse is present therein, a second counter is incremented by one as indicated at block 42. Finally, the potassium channel is queried and, again, if a pulse is present on the input from line 20, a third counter is incremented as indicated by block 46. Thereafter, the interrupt routine depicted in FIG. 3 is exited to return to the main routine shown in FIG. 2.

Next, as indicated by block 52, the third or K counter is tested to see if any counts are contained therein. If a count is detected, the K counter is decremented by one as indicated in block 54 and a first preselected digital number $N_1$ is added to a potassium (K) register as indicated in block 56.

In order to provide the stripping action required by the present invention, it is necessary to provide filtering in the MSU 26. However, by utilizing registers contained within MSU 26, the filtering can be accomplished without compacting the raw data being coupled into MSU 26. The numbers chosen are predetermined by the crystal utilized in the logging operation as well as speed at which the logging will occur.

Next, or if no count was present in the K counter, the counter corresponding to pulses received over the uranium channel are read and a test is performed, as indicated in block 62, to ascertain that one or more counts exists in the uranium counter, the uranium counter is decremented by one, as indicated at the block 64, and the preselected, digital number $N_1$ is added to a uranium (U) register, as indicated in block 66. Next, or if there were no counts in the uranium counter, a thorium counter is tested as indicated in block 72 and if one or more counts are found in the thorium counter, the U register is tested in accordance with block 74 to ascertain if there is a digital number greater than zero contained therein. If so, the K register is tested in accordance with block 76 to ascertain if there is a digital number in the K register greater than zero. If both of the conditions tested in blocks 74 and 76 indicate that the U register and K register both contain numbers greater than zero, the thorium counter is decremented by one, a preselected digital number $N_2$ is subtracted from the U register and a preselected digital number $N_3$ is subtracted from the K register, all as indicated in block 78.

Next, as indicated in block 92, the K register is read to ascertain if the digital number contained therein is less than or equal to zero. A negative reply in this test indicates that there is a number greater than zero contained in the K register at which time the contents of the K register is compared with the contents of the range K preset registry as indicated in block 94. If, the contents of the K register are greater than the range K preset, a pulse is outputted over line 20' from the microprocessor stripper unit 26 and which is indicative of an incident of gamma radiation resulting from radioactive potassium in the subsurface formations. Thereafter, as indicated in block 96, the number $N_1$ which was added to the K register in block 56 is now subtracted from the K register.

The next step, as indicated in block 102 is to perform the test indicated to ascertain if the number contained in the U register is less than or equal to zero. A negative result would indicate a positive digital number is contained within the U register. As indicated in block 104, this digital number is then compared with the contents of the range U preset register to determine if the number contained in the U register is greater than the range U preset. If the range preset is greater than the number contained in the U register, the program is exited through the return path to repeat the above-described process. If, however, the contents of the U register are greater than the range preset, the K register is tested, according to block 106, to ascertain if the number contained in the K register is less than or equal to zero. If the number is less than or equal to zero, a pulse is output from microprocessor unit 26 on output line 22' indicative of an occurrence of uranium gamma radiation being detected by the crystal contained in logging unit 10. Also, the number $N_1$ is subtracted from the U register and the return is initiated, whereby the above-described sequence is repeated. If, however, the contents of the K register is greater than zero, a preselected digital number $N_4$ is subtracted from the K register as indicated in block 108 and thereafter the operations above-described in block 110 are initiated including initiation of the return sequence.

Referring again to FIG. 1, it becomes evident from the above description that the potassium and uranium counts present on lines 20' and 22' respectively are now free from the influence of higher energy band pulses. Further, as they are now in a digital format as are the counts for the thorium and total count channels on lines 24' and 28 respectively, they may be coupled directly into a digital recorder 120 for recording and later processing.

However, the signals may also be coupled into single channel count rate meters such as are known in the art and as indicated with lines 20', 22', 24' and 28 interconnected to CRM's 130, 132, 134 and 136 which have been respectively assigned to the potassium, uranium, thorium and total count channels. The output of these count rate meters may then be conveniently coupled into a chart recorder 138 for immediate visual display. Note that as the measurement signals have been stripped prior to any processing, any convenient time constant may be set up in any of the shown count rate meters such that additional filtering and smoothing may be obtained.

Accordingly there has been described and illustrated herein apparatus in accordance with a preferred embodiment of the present invention wherein a new and improved method and apparatus for stripping and filtering extraneous counts from potassium and uranium energy bands. It will be apparent to those skilled in the art that changes and modifications may be made without departing from the invention in its broadest aspects. By way of example, it will be apparent that single channel stripping may be performed by merely deleting such portions shown in the logic routine in FIG. 2 which add a second channel. Further, it becomes apparent that additional channels can be stripped by merely expanding the logic routine. Further, it will also be apparent that, and referring now to blocks 72-82 in FIG. 2, rather than having to satisfy both conditions of the U register and K register having a digital number greater than zero, an either/or situation could readily be accomplished in which case the thorium count register could be decremented with the preselected number being subtracted from only the single register, or both if that is the case, in which the digital count contained therein is greater than zero. Accordingly, these and other modifications will be apparent to those skilled in the art.

The embodiments of the invention in which an exclusive property or privilege is claimed are defined as follows:

1. A method of producing a radioactive log indicative of the natural gamma radiation in preselected energy bands in the earth formations surrounding a borehole, comprising the steps of:
   detecting the natural gamma radiation energy spectra occurring in the earth formations and separating the spectra into discrete energy bands centered about preselected peak radiation energy levels;
   incrementing a first counter associated with a first preselected energy band whenever the energy level of detected radiation falls within said first energy band;

incrementing a second counter associated with a second preselected energy band centered about a different, higher peak-radiation level from said first preselected energy band whenever the energy level of detected radiation falls within said second energy band;

monitoring said first counter and decrementing said first counter and adding a first predetermined quantity to a first storage register for each increment detected in said first counter;

monitoring said second counter and decrementing said second counter and subtracting a second predetermined quantity from said first storage register for each increment detected in said second counter and generating a pulse indicative of an occurrence of detected radiation falling within said second energy band; and comparing the quantity remaining in said first storage register with a third predetermined quantity and generating a pulse indicative of an occurrence of detected radiation falling within said first energy band when said quantity remaining in said first register is greater than said third predetermined quantity and subtracting said first predetermined quality from said first register.

2. The method described in claim 1, and further including the steps of:

incrementing at least a third counter associated with a third preselected energy band centered about a different, higher peak-radiation level from said first and said second preselected energy bands whenever the energy level of detected radiation falls within said third energy band;

adding said first predetermined quantity to a second storage register for each increment detected in said second counter;

monitoring said third counter and decrementing said third counter and subtracting a fourth predetermined quantity from said first storage register and a fifth predetermined quantity from said second storage register for each increment detected in said third counter;

comparing the quantity remaining in said second storage register with a sixth predetermined quantity and generating a pulse indicative of an occurrence of detected radiation falling within said second energy band when said quantity remaining in said second register is greater than said sixth predetermined quantity and subtracting said first predetermined quantity from said second register.

3. The method described in claim 2, wherein said first energy band corresponds to potassium, said second energy band corresponds to uranium and said third energy band corresponds to thorium.

4. A system for producing a radioactivity log indicative of the number of gamma rays falling within at least two predetermined energy band and having a gamma ray detector which provides an output representative of the total natural gamma radiation spectra at a multi-channel pulse height analyzer which separates the radiation into discrete energy bands centered about the energy levels at which preselected radiation emitting elements exhibit peak gamma radiation intensities, comprising:

first counter means associated with a preselected energy band and responsive to an output from said multi-channel pulse height analyzer to increment said first counter means whenever the energy level of detected radiation falls within said first energy band;

second counter means associated with second preselected energy band centered about a different, higher peak-radiation level from said first preselected energy band and responsive to an output from said multi-channel pulse height analyzer to increment said second counter means whenever the energy level of detected radiation falls within said second energy band;

means, including a first storage register, for monitoring said first counter and decrementing said first counter and adding a first predetermined quantity to said first storage register for each increment detected in said first counter;

means for monitoring said second counter and decrementing said second counter and subtracting a second predetermined quantity from said first storage register for each increment detected in said second counter and generating a pulse indicative of an occurrence of detected radiation falling within said second energy band; and means for comparing the quantity remaining in said first storage register with a third predetermined quantity and generating a pulse indicative of an occurrence of detected radiation falling within said first energy band when said quantity remaining in said first register is greater than said third predetermined quantity and subtracting said first predetermined quantity from said first storage register.

5. The system described in claim 4 and further including:

at least a third counter associated with a third preselected energy band centered about a different, higher peak-radiation level from said first and said second preselected energy bands and responsive to said multi-channel pulse height analyzer to increment said at least a third counter whenever the energy level of detected radiation falls within said third energy band;

a second storage register associated with said means for monitoring said second counter and operative to add said first predetermined quantity to said second storage register for each increment detected in said second counter;

means for monitoring said at least a third counter and decrementing said at least a third counter and subtracting a fourth predetermined quantity from said first storage register and a fifth predetermined quantity from said second storage register for each increment detected in said at least a third counter; and means for comparing the quantity remaining in said second storage register with a sixth predetermined quantity and generating a pulse indicative of an occurrence of detected radiation falling within said second energy band when said quantity remaining in said second storage register is greater than said sixth predetermined quantity and subtracting said first predetermined quantity from said second storage register.

6. The apparatus described in claim 5, wherein said energy band corresponds to potassium, said second energy band corresponds to uranium and said third energy band corresponds to thorium.

7. A method for determining the amounts of natural gamma radiation from potassium, uranium and thorium in earth formations, comprising the steps of:

detecting natural gamma radiation pulses within energy bands corresponding to potassium, uranium and thorium;

adding a first quantity to a first storage register for each pulse detected within said potassium energy band and to a second storage register for each pulse detected within said uranium energy band;

subtracting a second quantity from said first storage register for each pulse detected within said uranium energy band;

subtracting a third quantity from said first storage register and a fourth quantity from said second storage register for each pulse detected within said thorium energy band;

comparing the quantity in said first storage register to a fifth quantity and the quantity in said second storage register with a sixth quantity;

generating a pulse indicative of gamma radiation corresponding to potassium when said first storage register quantity exceeds said fifth quantity;

generating a pulse indicative of gamma radiation corresponding to uranium when said second storage register quantity exceeds said sixth quantity; and recording indications of gamma radiation corresponding to potassium, uranium and thorium.

* * * * *